1

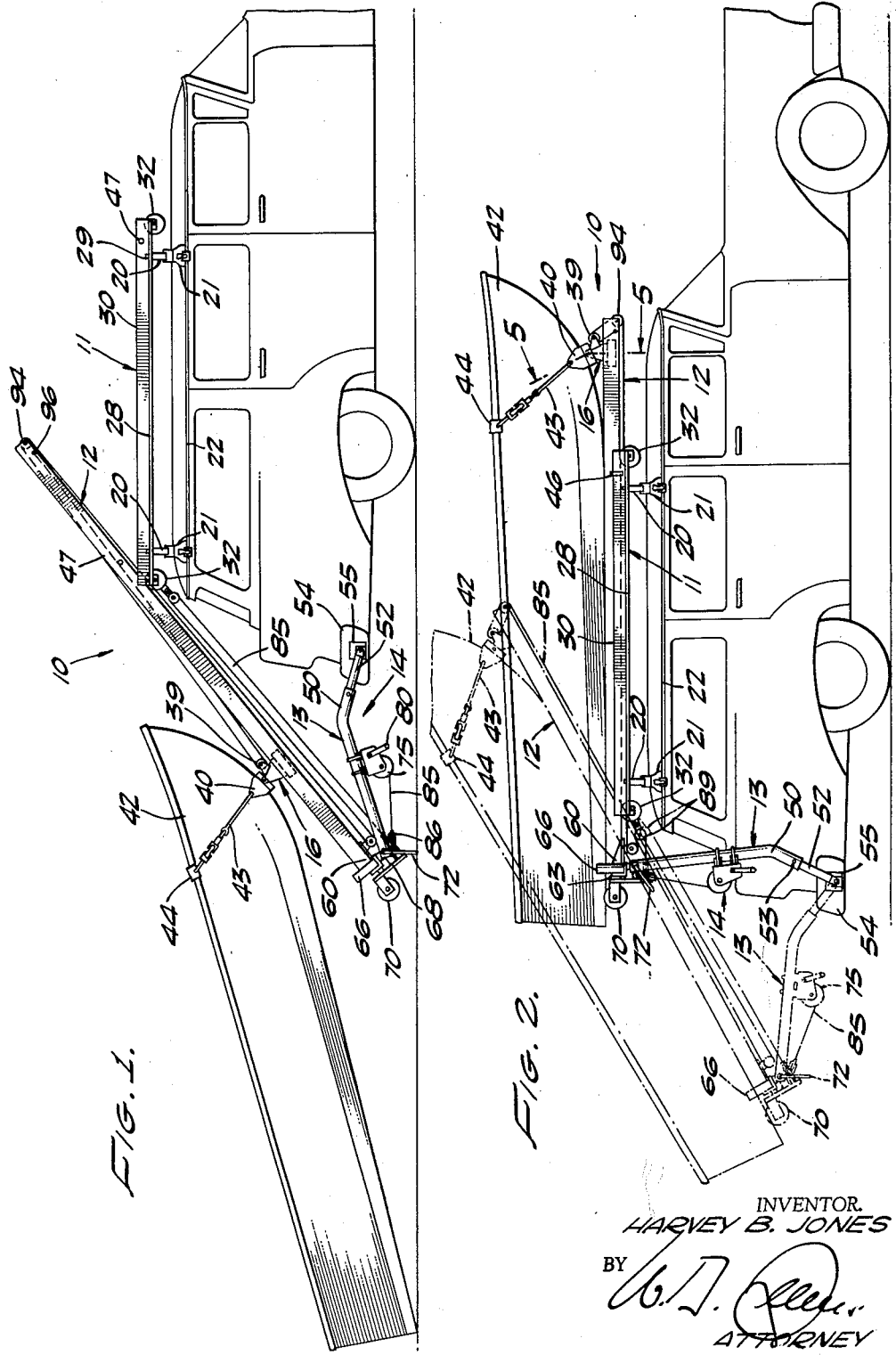

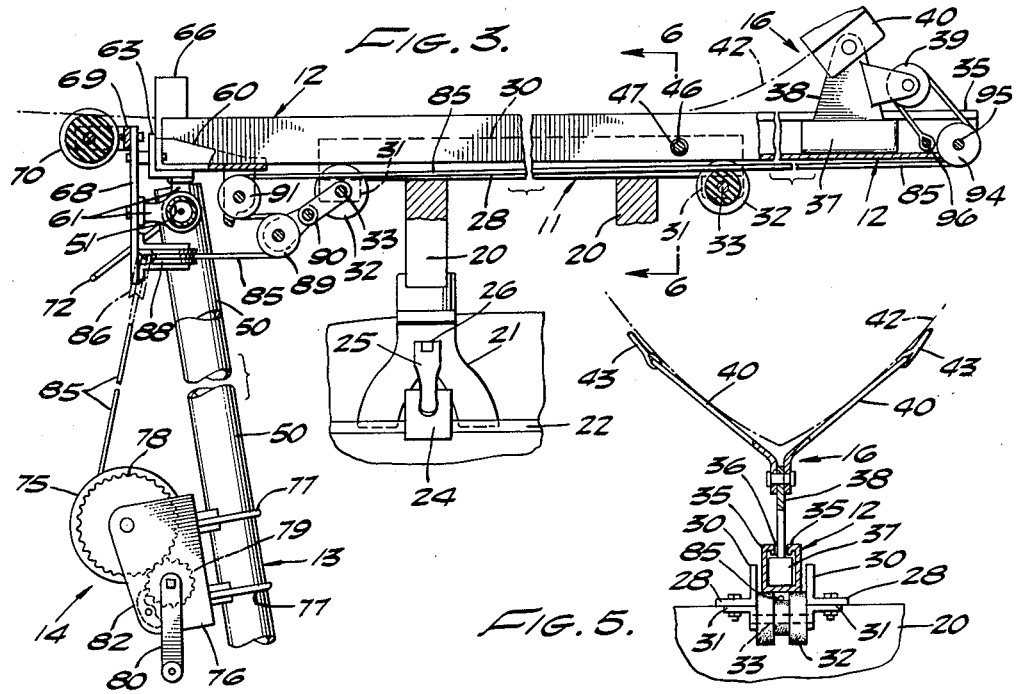
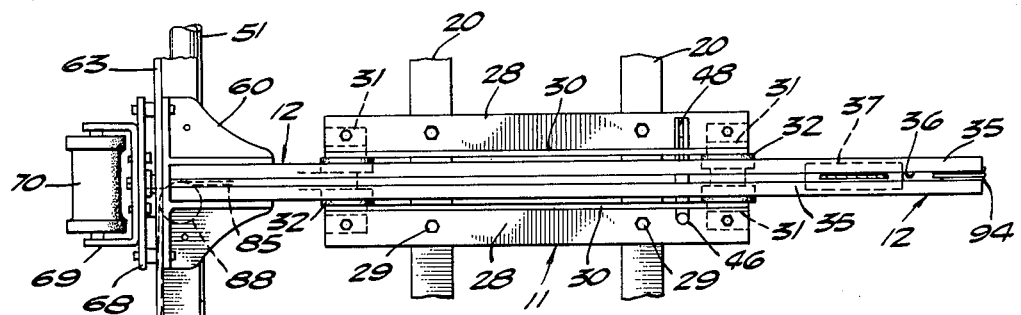
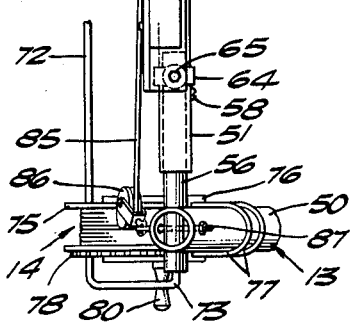
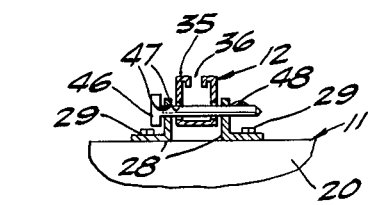
INVENTOR.
HARVEY B. JONES
BY
ATTORNEY

3,128,893
BOAT HANDLING AND LOADING ASSEMBLY
Harvey B. Jones, 3843 Strang St., Rosemead, Calif.
Filed Apr. 30, 1962, Ser. No. 190,894
16 Claims. (Cl. 214—450)

This invention relates to boat transporting devices and more particularly to an improved, versatile assembly for transferring a small boat between the ground and the roof of a motor vehicle using a manually operated winch and including means for firmly anchoring the boat to the roof of the vehicle for transport from place to place.

This application is a continuation-in-part of my copending application for United States Letters Patent, Serial No. 96,780, filed March 20, 1961, entitled Car Top Boat Loader and Carrier.

Various proposals have been made heretofore for devices adapted to be attached to the roof of a motor vehicle for use in transporting a small boat between the owner's home and the place where the boat is to be used. Such devices have presented various problems including those of providing simple effective means for transferring the boat between the ground and the carrying device on the vehicle roof. Numerous devices have been proposed for this purpose including rollers forming part of the boat carrying assembly and arranged along its side or across its end and having as their purpose that of facilitating the transfer of the boat to and from the car. Other devices include various arrangements of linkages, trackways and other devices but all of these are subject to numerous shortcomings and disadvantages sought to be obviated by the present invention.

An exemplary embodiment of the present invention includes an anchorage and support assembly firmly securable to the roof of the vehicle and, in addition, a boat lifting and transfer unit having a generally Y-shaped main frame the stem of which has a swiveling connection with the rigidly interconnected two arms of this main frame. The ends of these arms or struts are pivotally connected to the vehicle body as to spaced points along the rear bumper. A boat supporting carriage is movable lengthwise of the stem of the Y-frame and includes a cable assembly trained over pulleys and connected at one end to a hand operated winch. When these principal components are in boat loading position, the Y-shaped main frame is pivoted rearwardly with both its arms and the stem portion of the Y-frame inclined downwardly. The bow of the boat is then seated in and secured to the carriage. Operation of the winch tensions the cable to pull the carriage and the attached boat upwardly along the inclined frame until the boat is fully supported thereon. Further operation of the winch then acts to pivot the frame and the attached boat upwardly until the boat is in a horizontal carrying position above the vehicle roof. Unloading of the boat is accomplished equally as expeditiously by first pivoting the Y-shaped frame rearwardly and slackening the cable through the winch thereby permitting the boat to be lowered at a desired speed by gravity forces as controlled by the operator by restraining action applied to unreeling of the winch.

Accordingly, it is a primary object of the present invention to provide a new and improved boat handling and loading assembly readily attachable to any motor vehicle and including a manually operable winch and pulley system to facilitate transfer of a boat to and from the roof of a motor vehicle.

Another object of the invention is the provision of a simple cable and winch operated boat loading assembly featuring an elongated rigid guideway for a carriage which guideway is pivotally connected to a rigid strut pivotally supported at its lower end to the vehicle body.

2

Another object of the invention is the provision of a boat loading assembly attachable to a motor vehicle and including a cable assembly and an operating winch effective to elevate a boat from the ground upwardly over one end of a vehicle roof into a horizontal carrying position on the roof and also operable to transfer the boat back to the ground under the control of the same cable and winch assembly.

These and other more specific objects will appear upon reading the following specification and claims and upon considering in connection therewith the attached drawings to which they relate.

Referring now to the drawings in which a preferred embodiment of the invention is illustrated:

FIGURE 1 is a side elevational view of a boat handling and carrying assembly embodying the present invention and shown mounted on the roof of a motor vehicle with the parts disposed in the position occupied in an initial stage of a boat loading operation;

FIGURE 2 is a view similar to FIGURE 1 but showing in full lines the boat to be loaded on the vehicle and including a dot-and-dash line showing of the parts in an intermediate stage of the loading operation;

FIGURE 3 is an enlarged fragmentary view showing the parts on an enlarged scale and positioned as they are when the boat is fully loaded on the vehicle;

FIGURE 4 is a top plan view of the parts shown in FIGURE 3;

FIGURE 5 is a fragmentary cross-sectional view on an enlarged scale taken along line 5—5 on FIGURE 2 and showing details of the carriage; and FIGURE 6 is a fragmentary transverse view of means for locking the assembly in its boat transporting position and taken along line 6—6 on FIGURE 3.

Referring now more particularly to FIGURES 1 and 2, there is shown a preferred embodiment of the boat handling and loading assembly designated generally 10. The principal subassemblies include an anchorage unit 11 adapted to be rigidly but detachably secured to a vehicle roof and a generally Y-shaped main frame having an elongated stem or guide rail 12 pivotally connected to the bight portion of the rigidly connected arms or struts 13 of this main frame. The remaining principal component of the assembly includes a manually operated winch 14 for a cable trained over a series of pulleys to be described and including a pulley mounted on a carriage 16 supporting the front end of the boat and movable lengthwise for the full length of stem portion 12 of the main frame. These principal subassemblies and their operating relation to one another will now be described in detail.

The anchorage and load supporting unit 11 is best shown in FIGURES 1, 3 and 4, and comprises a pair of transverse supports 20, 20 extending crosswise of the vehicle roof and having clamping brackets 21 of identical construction projecting downwardly from their opposite ends and securely clampable to the rain gutter 22 of the vehicle roof. It will be understood that cross members 20 and clamping brackets 21 may be of any suitable construction such as that shown, for example, in United States Patent 2,887,237, granted to La Verne O. Ellingson on May 19, 1959. Clamping brackets 21 include inverted V-shaped struts the lower ends of which are designed to seat in the upper side of the rain gutter and are equipped with a clamping jaw 24 engageable against the underside of the rounded gutter and are arranged to be pulled tightly thereagainst by a toggle lever 25 pivotally connected to a boss 26 projecting outwardly from the side of strut 21. Although not essential, transverse members 20, 20 are here shown as rigidly interconnected by a pair of angle iron members 28, 28 (FIG- URE 4) secured thereto as by bolts 29. The vertically extending flanges 30 of members 28 are spaced laterally of one another to provide an intervening channel or guideway for stem 12 of the Y-shaped main frame.

The opposite ends of angle irons 28, 28 are provided with brackets 31 supporting spool-shaped rollers 32, 32 on axles 33 mounted between the brackets as is best shown in FIGURE 5. The end flanges of rollers 32 provide a roller support for the stem portion 12 of the main frame whereas the relieved central section of the rollers receives and provides room for the cable to be described presently.

The stem or guide rail 12 of the Y-shaped main frame is conveniently formed in the contour best shown in FIGURE 5 and conveniently described as of C-shape with inturned lips 35, 35 extending toward one another and cooperating to form a narrow intervening slot 36 extending the full length of the guide rail. Slidably supported along the interior of the guide rail is the main body 37 of carriage 16. The main body 37 may be formed of nylon or other material having good abrasion resisting characteristics and a low coefficient of friction. This body is sized to have a loose sliding fit with the adjacent interior surfaces of the rail and has firmly secured thereto an upstanding bracket supporting a pulley 39 as well as a pair of pivoting cradling strips 40, 40 shaped and cooperating to embrace the bow of a small boat 42. Cables, straps or the like 43 of adjustable length are attached to the upper ends of cradle 40 and include clamps securable firmly about the gunwales of the boat in the manner indicated in FIGURES 1 and 2.

Referring to FIGURES 3, 4 and 6, it is pointed out that guide rail 12 is preferably locked immovably but releasably to anchor unit 11 by a single locking pin 46 the shank of which is insertable through aligned holes 47 formed through the upstanding members of angle irons 28 and through the side wall of the guide rail 12 (FIGURE 6). Locking pin 46 may be releasably secured in position by a spring retainer 48 which is depressible upon engagement with the edge holes 47 as the operator applies a pulling or pushing force to the pin. Desirably, locking pin 46 is secured to angle iron member 28 by a short length of chain to avoid risk of its loss while withdrawn from holes 47.

The construction of the rigidly interconnected arms or struts 13 of the Y-shaped frame and the pivotal connection of these to the rear end of guide rail 12 will now be described with particular reference to FIGURES 3 and 4. As there shown by way of example, struts 13 include vertical tubular members 50, 50 rigidly secured at their upper ends to a horizontally disposed transverse tubular unit 51. Telescoped within the lower end of members 50 are a pair of short tubes 52 secured in any desired telescoped position of tubes 50, 52 by a through bolt 53. This arrangement permits the vertical struts to be adjusted to any desired height appropriate to accommodate assembly 10 on a particular motor vehicle. The lower ends of tubes 52 are pivotally clamped to a part of the chassis frame, as rear bumper 54, by means of suitable clamping devices 55. As is best shown in FIGURE 4, the junction of struts 50 with transverse tube 51 includes short tubes 56 locked adjustably within the ends of cross tube 51 as by set screws 58.

It will be understood that the two arms of strut component 13 may comprise an inverted V-shaped tube the diverging lower ends of which are fitted with longitudinally adjustable tubes 52 together with the clamping devices 55 for securing this simplified component of the main frame to the vehicle chassis or bumper.

The rear end of guide rail 12 is pivotally connected to the central or bight portion of the strut member 13, as by a casting 60 riveted, welded or otherwise rigidly secured to the guide rail. Casting 60 includes a bracket 61 provided with a long axis pivoting connection about the midportion of transverse tube 51 forming a part of strut assembly 13. Rigidly secured across the end of bracket 60 is an angle iron 63, the outer ends of this angle iron being anchored to the opposite ends of tube 51 as by eye-bolts 64 having threaded shanks 65 extending upwardly through openings in the angle iron (FIGURE 4). Also secured to the outer ends of angle iron 63 are pillow blocks 66 shaped and positioned to be engaged by the under, rear end of the boat. It will be understood that these blocks may be made of wood and covered with a rubber, plastic or other soft gasket to avoid risk of damage to the bottom of the boat.

Also secured to casting 60 is a plate 68 supporting a bracket 69 for a wide roller 70 and positioned to engage the keel or the bottom of the boat to support the latter while being shifted into and out of carrying position on a vehicle.

The main frame of carrying assembly 10 also includes a combined handle and supporting strut 72 of generally U-shape, its inturned opposite ends 73 being journaled in the opposite ends of the transverse tubes 51, 56 (FIGURE 4). In the position of the components shown in FIGURE 1, the handle and bail member 72 lies in a generally vertical plane and acts as a gravity-actuated strut to support the outer end of the main frame in an appropriate inclined position off the ground. When the boat is in carrying position on the vehicle, handle 72 pivots inwardly against the rear of the vehicle where it is readily available to be grasped by the operator and pivoted outwardly to provide a handle useful to pull the boat and the main frame of the carrier rearwardly thereby expediting unloading of the boat from the vehicle.

The winch and cable assembly 14 by which the boat is pulled into its fully loaded position will now be described, particular reference being had to FIGURES 3 and 4. Winch 14 includes a main cable storing spool 75 journaled in a bracket 76 rigidly clamped to strut 13, as by U-bolts 77. The teeth 78 of reel 75 engage with teeth 79 journaled in bracket 76 and fixed to a shaft of an operating crank 80. A locking dog 82 mounted on bracket 76 is engageable with teeth 79 to lock the winch against rotation in either direction.

Cable 85 is securely anchored to reel 75 and extends upwardly through a pulley 86 anchored to the upper end of strut 50, as by an eye-bolt 87 (FIGURE 4). Cable 85 then passes through a vertical axis pulley 88 mounted on the underside of casting 60. The cable then passes over pulley 89 supported in a clevis 90 secured to the rear end of angle irons 28 and forming part of anchorage assembly 11. The cable then passes rearwardly and over a horizontal axis pulley 91 mounted in a bracket 92 projecting downwardly from casting 60. Cable 85 then extends along the underside of guide rail 12 to a pulley 94 supported on a pin 95 in the slotted forward end of the guide rail. The cable then passes over pulley 39 of the carriage 16 and downwardly to an anchor bolt 96 mounted crosswise of the guide rail.

In the operation of the described boat handling and loading device 10, let it be assumed that the components have been properly assembled to a vehicle roof in a manner made obvious from the foregoing detailed description of the components. Also, let it be assumed that the Y-shaped main frame components 12, 13 have been lowered to the position shown in FIGURE 1 with the junction portion of guide rail 12 and strut unit 13 supported off the ground by strut member 72. Reel 14 is then slackened additionally permitting carriage 16 to slide rearwardly along guide rail 12 to a position closely adjacent the lower rear end of the guide rail. The bow of the boat is then cradled between the upwardly inclined saddle members 40 of the carriage unit and clamps 44 are firmly secured to the gunwales of the boat preferably rearwardly of the forward cross brace of the boat thereby providing assurance that the clamps cannot slip forwardly.

Crank 80 of the winch is now rotated to tension cable 85 and pull carriage 16 and the boat onto the guide rail. As will be readily appreciated from a consideration of FIGURE 1, the tensioning of the cable over the foremost roller or pulley 94 is effective to haul carriage 16 upwardly along guide rail 12 thereby elevating and advancing the bow of the boat lengthwise of this rail, the boat continuing to move forwardly on carriage 16 until the carriage reaches the foremost end of the rail.

Further tensioning of the cable by the operation of winch 14 is then effective to pivot the strut unit 13 and guide rail 12 along with the boat to its final loaded position atop the vehicle roof. This pivoting action takes place in the usual loading operation only after carriage 16 reaches the forward end of the guide rail. This is for the reason that far less force is required to shift the boat and carriage 16 along the guide rail than is required to elevate guide rail 12, strut unit 13 and the boat. However, it does sometimes happen that the strut unit 13 pivots upwardly until roller 70 engages the bottom of the boat, strut 13, then remaining in this position until the carriage has reached its final forward position. Continued operation of the winch then acts through pulley 89 secured to the rear end of the guide rail 12 to pivot the boat as well as main frame components 12, 13 upwardly onto the top of the vehicle. During this operation the bottom of the guide rail rides across the roller 32 mounted at the rear end of angle iron members 28, 28, the forward end of the guide rail and the boat eventually pivoting downwardly toward the top of the car as permitted by its advance over the fulcrum provided by roller 32. As the guide rail pivots to its horizontal position, its forward end bears against the foremost roller 32 and rolls therealong during the final stage of the loading movement.

It will be observed from FIGURE 2 that the height of strut 13 desirably is so adjusted to be slightly greater than the vertical distance between the lower end of strut 13 and a horizontal plane through and tangent to the upper edge of rollers 32, 32. The significance of this resides in the fact that this arrangement permits the upper end of strut unit 13 to pivot forwardly from a vertical plane passing through the pivoted lower end of this strut. In consequence, the entire main frame 12, 13 is biased toward a carrying position above the roof of the vehicle with the weight of the boat and of the guide rail assembly aiding in holding the load against rearward unloading movement.

At this time, openings 47 at the forward end of angle iron 28 will be aligned with the similar openings through guide rail 12. Locking pin 46 is then inserted through these aligned openings thereby positively locking the parts against relative movement. Additionally, appropriate lashing is applied between the rear end of the boat and the opposite ends of transverse members 20, 20.

Some users prefer to carry the boat in an upside-down position. If so, it is merely necessary to modify the cradle provided by members 40, 40 of carriage 16 to receive and support the inverted bow portion of the boat. It may also be desirable when loading the boat inverted to provide one or more additional rollers corresponding to roller 70 and disposed along angle iron member 63 to either side of the guide rail 12 and positioned to underlie the gunwales of the boat while the latter is being shifted between its loaded and unloaded positions.

Unloading of the boat after arrival at the destination is carried out by removing the lashing applied across the rear end of the boat. Next, the locking pin 46 is withdrawn and handle 72 at the rear end of the carrying assembly is pulled outwardly and rearwardly to shift the Y-shaped main frame rearwardly along rollers 32, 32. Before this operation is carried out, it is, of course, necessary to unlock dog 82 of the winch and to unwind the reel to provide a considerable amount of slack cable. The midportion of handle 72 is then grasped and pivoted outwardly to pivot the boat and the Y-frame rearwardly about the pivot for the lower end of the struts. The guide rail rolls along both rollers 32, 32 until the rear end of the boat starts to pivot downwardly. Thereafter, only the rear roller 32 is used. Once the boat starts to pivot rearwardly about roller 32, the operator grasps crank 80 and applies a restraining force to control the lowering speed to a safe rate. Meanwhile, the gravity pivoted strut 72 assumes a vertical position automatically in readiness to support the rear end of the main frame as it approaches the ground. Thereafter, the operator lifts the rear end of the boat and pulls it rearwardly with the forward end supported in cradle 40 of carriage 16.

While the particular boat handling and loading assembly herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A cable-operated car-top boat handling accessory adapted to be attached to a motor vehicle and useful in loading and transporting a small boat on the top of the vehicle, said accessory comprising anchor means including means for securing the same rigidly to the roof of a motor vehicle to support a boat thereon, an inverted U-shaped frame having means for pivotally connecting the lower end of its legs to the lower lateral sides of a vehicle at one end thereof, an elongated rigid member movably connected centrally to the bight portion of said U-shaped frame and extending lengthwise of the vehicle top, winch means mounted on said U-shaped frame having cable means extending therefrom over roller means carried by said anchor means on the car roof and thence over other roller means on said rigid frame member and including means for attaching said cable means to the bow of a boat to be loaded on the car roof, said winch and cable means being operable to pull the boat lengthwise of said elongated member and upwardly onto the vehicle roof as said U-shaped frame is elevated upwardly into a generally vertical boat-carrying position.

2. A cable-operated car-top boat handling accessory for use in transferring a small boat between the water and the top of a motor vehicle, said accessory comprising anchor means attachable rigidly to the vehicle roof for supporting a boat on the roof, guide rail means extending lengthwise of the vehicle roof and including pivoting support means movably connected to one end thereof for supporting said guide rail means selectively horizontally on the roof of the vehicle and in an inclined position extending downwardly from one end of the vehicle roof to a position near ground level, a carriage for supporting one end of the boat movably along said guide rail means, and manually operable cable-winding winch means connected to said carriage and said anchor means and passing over roller means at the forward end of said guide rail means operable to pull a boat along said guide rail means and for then transferring said guide rail means and the boat thereon from the inclined to the horizontal position thereof above the vehicle top.

3. A cable-operated car-top boat handling accessory for use in transferring a small boat between the water and the top of a motor vehicle, said accessory comprising anchor means attachable rigidly to the vehicle roof for supporting a boat on the roof and including a pair of rigid members having means for anchoring the same rigidly crosswise of the front and rear ends of the roof and including elongated rigid tie means extending centrally lengthwise of the vehicle and secured to said rigid members, an elongated guide rail supporting a carriage for movement therealong, strut means pivotally connectable to one end of vehicle chassis and pivoting in a vertical plane between a generally vertical load-carrying position and a downwardly inclined loading position, means pivotally connecting one end of said guide rail to the midportion of said strut means, winch means mounted on said strut means and having a cable thereon operatively connected to said carriage means and to said anchor means near the end of the vehicle remote from said strut means and operable to pull said carriage along said rail means and to pivot said strut means upwardly to its vertical load-carrying position.

4. An accessory as defined in claim 3 characterized in that said winch means includes a crank conveniently positioned for operating the same by an operator standing on the ground.

5. An accessory as defined in claim 3 characterized in that said guide rail includes a one-piece member of channel shape in cross section and having inwardly projecting lips integral with the free edges of the side flanges thereof, and said carriage having a sliding fit within said guide rail and being held captive therewithin by said lips.

6. An accessory as defined in claim 5 characterized in that said carriage includes a rigid bracket projecting outwardly through the space between said lips, a cable pulley mounted on said bracket, and the upper end of said bracket being Y-shaped and including means for securing the outer ends thereof to the opposite sides of a boat to anchor the same to said carriage and thereby to said guide rail.

7. An accessory as defined in claim 6 characterized in the provision of roller means mounted for rotation about a horizontal axis adjacent the junction of said guide rail with said strut means and adapted to support the weight of a boat while in movement along said guide rail.

8. A boat handling and loading assembly adapted to be detachably secured to the top and one end of a motor vehicle, said assembly comprising elongated rigid means having supporting arms crosswise of its opposite ends provided with clamping means for securing said rigid means lengthwise above the top of a vehicle, inverted U-shaped strut means having means for pivotally connecting the ends of its legs to the lower end portion of a vehicle for movement of said strut through an arc in a vertical plane, elongated guide rail means pivotally connected at one end to the central bight portion of said U-shaped strut means and movable lengthwise of said first-mentioned rigid means and about a fulcrum near one end of the latter means, carriage means for one end of a boat movable along said guide rail means, a cable winch secured to said boat loading assembly, and means including a cable and a plurality of pulleys connected between said carriage, said winch and components of said loading assembly operable upon rotation of said winch while said strut means is pivoted downwardly to a position close to the ground opposite one end of the vehicle to pull a boat upwardly onto the vehicle top as said strut means is elevated upwardly into a substantially vertical boat carrying position.

9. A boat handling and carrying assembly attachable to the roof of a motor vehicle and useful in transferring a boat to and from a carrying position lengthwise above the vehicle, said assembly comprising anchor means rigidly securable to the end of the vehicle roof, strut means pivotally connected at one end thereof to the end of an elongated guide rail extending lengthwise of the vehicle roof and movable across said anchor means while pivoting about said anchor means as a fulcrum, carriage means slidable lengthwise of said guide means and including means for securing one end of a boat cradled in said carriage means, means for pivotally securing the lower end of said strut means to the lower portion of the vehicle for movement of the strut means in a vertical plane parallel to the length of the vehicle, and manually operable winch and cable means connected between said carriage means and another component of said boat loading assembly and operable to pull a boat lengthwise of said guide rail while the latter is inclined downwardly toward the ground and for then pivoting said strut means upwardly while shifting said guide rail and boat lengthwise of the vehicle roof and across said anchor means.

10. An assembly as defined in claim 9 characterized in that said winch means is anchored to said strut means.

11. An assembly as defined in claim 9 characterized in that said strut means is pivotal upwardly and slightly past a vertical plane passing through the lower pivot connections between said strut means and the vehicle, said anchor means including roller means having its axis extending horizontally crosswise of the end of the vehicle roof.

12. A boat handling and loading assembly for use in loading and carrying a boat lengthwise on the roof of a motor vehicle and for loading the same from the rear end of the roof, said assembly comprising a Y-shaped main frame and including a swiveling connection between the junction of the stem with the diverging arms of said Y-frame, said stem providing a guide rail and including carriage means movable therealong which carriage means includes means for securing one end of a boat cradled therein, the free ends of the arms of said Y-frame including means for pivotally securing the same to either lateral corner of the vehicle frame, roller equipped anchor means secured centrally of the rear end to the vehicle roof and serving as a roller fulcrum for the stem of said Y-frame, and winch-operated cable means mounted on one of said diverging arms of said Y-frame and attached to said carriage operable as the cable is coiled onto the winch means to pull a boat upwardly along the stem of said Y-frame and across said anchor means into a horizontal carrying position on the vehicle roof as the Y-frame is pivoted upwardly and forwardly.

13. The assembly defined in claim 12 characterized in the provision of roller means engageable by the lower edge of the boat keel and supported by said Y-frame adjacent the junction of the stem with the arms of said Y-frame.

14. The assembly defined in claim 13 characterized in the provision of anchor means for said assembly including means extending transversely of the forward end of the vehicle roof and including clamp means for detachably securing the ends thereof to the opposite lateral sides of the vehicle roof.

15. The assembly defined in claim 13 characterized in that the lower ends of the arms of said Y-frame include means for adjusting the length thereof to accommodate vehicles having roofs spaced different vertical distances above their rear bumpers.

16. The assembly defined in claim 13 characterized in that said winch means includes means for clamping the same on one of the arms of said Y-frame.

References Cited in the file of this patent

UNITED STATES PATENTS

| 2,558,418 | Brueckman | June 26, 1951 |
| 2,573,187 | Desilets | Oct. 30, 1951 |
| 2,763,384 | Foster | Sept. 18, 1956 |
| 2,765,940 | Nelson | Oct. 9, 1956 |
| 2,808,952 | Nicholas | Oct. 8, 1957 |
| 2,809,496 | Geil | Oct. 15, 1957 |
| 2,931,528 | Mabry | Apr. 5, 1960 |
| 3,048,291 | Mabry | Aug. 7, 1962 |
| 3,066,815 | Johnson | Dec. 4, 1962 |